United States Patent

Leicht et al.

[11] Patent Number: 5,501,122
[45] Date of Patent: Mar. 26, 1996

[54] COUPLING DEVICE FOR CONNECTING AN ENGINE BLOCK TO A GEAR CASE

[75] Inventors: Werner Leicht, Stetten; Dietrich Koch, Tettnang; Juergen Giesselmann, Markdorf, all of Germany

[73] Assignee: MTU Motoren- und Turbinen- Union Friedrichshafen GmbH, Friedrichshafen, Germany

[21] Appl. No.: 184,986

[22] Filed: Jan. 24, 1994

[30] Foreign Application Priority Data

Jan. 26, 1993 [DE] Germany .............. 43 02 007.0

[51] Int. Cl.⁶ .............. F16H 57/02; F16B 2/14
[52] U.S. Cl. .............. 74/606 R; 403/370
[58] Field of Search .............. 74/606 R; 403/367, 403/368, 370

[56] References Cited

U.S. PATENT DOCUMENTS

| | | | |
|---|---|---|---|
| 3,776,651 | 12/1973 | Peter et al. | 403/370 X |
| 3,995,824 | 12/1976 | Bauer | 403/370 X |
| 4,078,276 | 3/1978 | Nunes | 403/370 X |
| 4,089,613 | 5/1978 | Babbit, Jr. | |
| 4,911,417 | 3/1990 | Short | 403/368 X |
| 5,078,027 | 1/1992 | Lohmer et al. | 74/606 R |

FOREIGN PATENT DOCUMENTS

| | | | |
|---|---|---|---|
| 898982 | 4/1953 | Germany. | |
| 2706105 | 8/1978 | Germany. | |
| 4002791 | 8/1991 | Germany. | |
| 405319119 | 12/1993 | Japan | 74/606 R |

Primary Examiner—Charles A. Marmor
Assistant Examiner—Mary Ann Battista
Attorney, Agent, or Firm—W. G. Fasse; W. F. Fasse

[57] ABSTRACT

Two components, such as an engine block (1) and a gear case (2), are coupled to each other by at least two flexible coupling links (7, 8) and by a rigid coupling link (10). One end of each flexible coupling link is connected to the engine block or gear case by a first screw connector (11, 11A, 11B) having a threaded bolt (13) passing through a twin cone (16) acting as a centering member. The conical surfaces of the twin cone centering member (16) cooperate with respective conical surfaces (12) in the gear case (2) and in an expander ring (17) bearing with its outer surface against an inner surface of a hole in the coupling link (7, 8) or an intermediate bushing in the coupling link, whereby the force transmitting connection is accomplished with radial clamping forces. The cooperation of the conical surfaces compensates for alignment tolerances and uneven stress distributions are avoided.

20 Claims, 3 Drawing Sheets

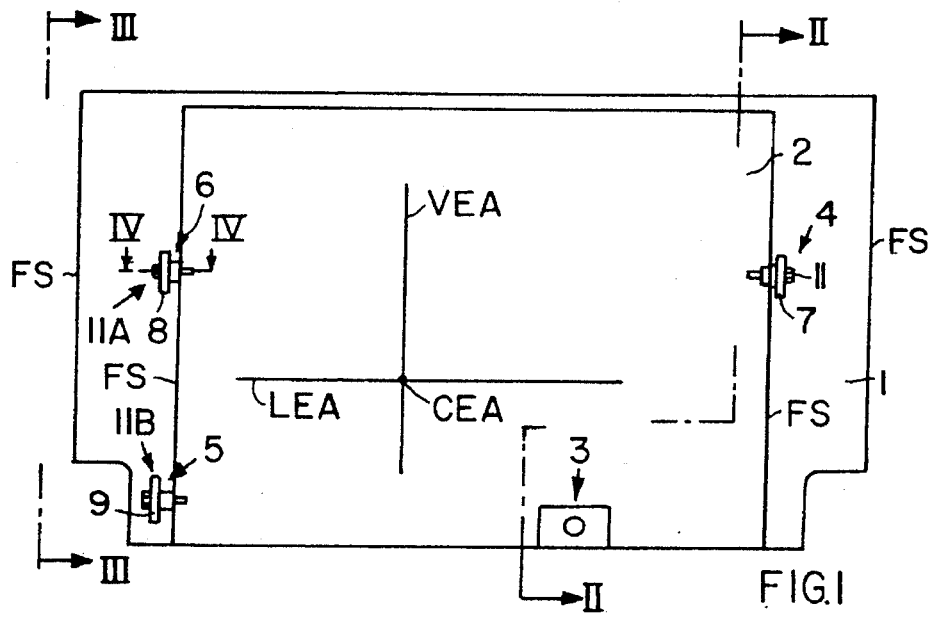
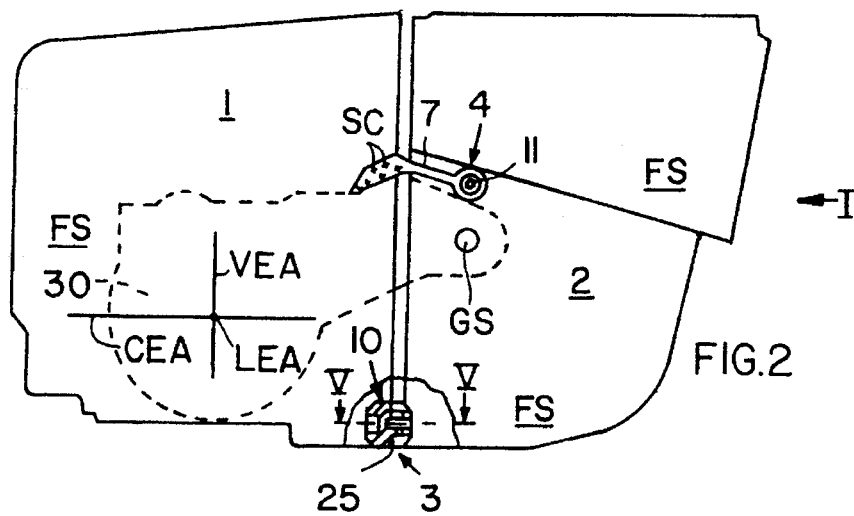
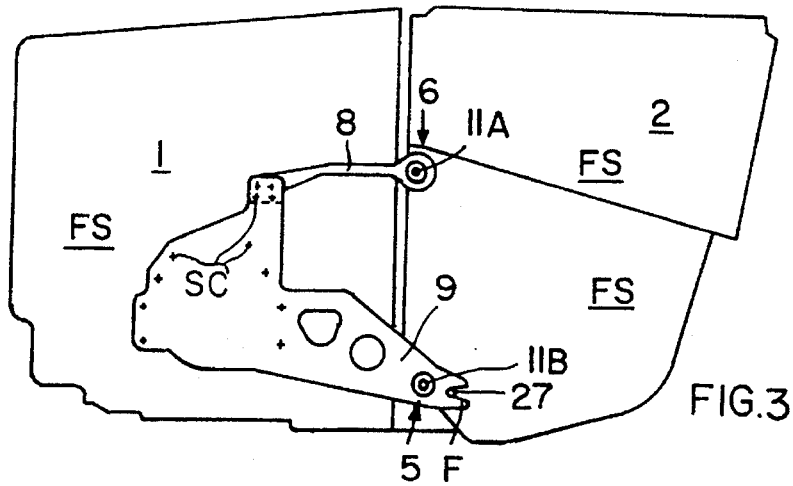

COUPLING DEVICE FOR CONNECTING AN ENGINE BLOCK TO A GEAR CASE

FIELD OF THE INVENTION

The invention relates to a coupling device for connecting an engine block to a gear case, whereby the device facilitates the centering of the engine block and the gear case relative to each other.

BACKGROUND INFORMATION

It is known to secure the engine block and the gear case of drive trains to each other, whereby it is important that a proper centering is accomplished in order to avoid uneven tensioning of the block and case.

German Patent Publication DE 4,002,791 A1 describes several possibilities of securing a gear case to one of the longitudinal sides of an engine block. According to one conventional version the engine block and the gear case are rigidly connected to each other at one end, while the other end is formed by a dovetail connection that permits an axial movement of the engine block and gear case relative to each other. Another conventional version employs a lever joint or mounting plates that are flexible in the direction of the longitudinal engine block axis, whereby different expansions of the engine block and the gear case are possible due to the influence of different temperatures. However, couplings using bolts and joints as just described have the disadvantage that either the required play cannot be achieved or that assembling the coupling is rather difficult because the proper or rather exact alignment of the engine block with the gear case is difficult. Where conventionally flexible plates are used for the coupling, it is possible to achieve a connection or coupling that is free of play. However, connecting the plates with screws has the disadvantage that the axial clamping forces cause uneven tensioning of the block and case due to positional and component manufacturing tolerances. Such uneven tensioning causes undesirable stresses.

German Patent Publication (DE-PS) 2,706,105 discloses a coupling of two engine housings or housing components to each other by a flange connection with clamping claws. It is an advantage of the just mentioned clamping claw connection that the assembly and disassembly can be accomplished quite simply because the clamping screws needed for the clamping claws are easily accessible. The clamping claws rigidly connect the engine block and the gear case to each other.

Another conventional clamping device or coupling device is described in German Patent (DE-PS) 898,982, wherein a tensioning arbor is used for clamping work pieces in a machine tool. The clamping is accomplished with two clamping elements on a mounting arbor, whereby the clamping elements mate with respective conical surfaces. By axially displacing the clamping elements by means of a clamping nut on the threaded arbor, the outer clamping element of the two clamping elements is radially expanded. In this manner a work piece surrounding the outer clamping element is fixed in position by radially effective clamping forces.

OBJECTS OF THE INVENTION

In view of the above it is the aim of the invention to achieve the following objects singly or in combination:

to provide a coupling between two components such as an engine block and a gear case, which is free of play, yet permits an even distribution of tension stresses caused by the coupling;

to assure that any manufacturing tolerances in the engine block and the gear case do not cause any uneven tensioning when these components are coupled to each other;

to provide a coupling device of the type described that is simple to install and easily accessible for subsequent maintenance work; and to provide a coupling device that will permit an initial centering of the two components, one relative to the other and upon tightening will reduce any axially effective forces and replace these axially effective forces by radially effective coupling forces.

SUMMARY OF THE INVENTION

The above objects have been achieved according to the invention by the combination of the following features. The components are coupled to each other by at least three coupling links, one of which is rigid, while the remaining two or more coupling links have a certain flexibility at least in determined directions and the flexible coupling links are connected to either the motor block and/or the gear case by a screw connector according to the invention, which makes use of the cooperation of conical coupling surfaces. The rigid coupling link also makes use of cooperating conical surfaces driven by a threaded drive spindle. The screw connector according to the invention comprises a threaded bolt having a threaded end which engages into a threaded hole in the component, whereby a conical recess in the component leads into the threaded hole. A centering member in the form of a self-centering twin cone is axially slidable on the threaded bolt. A radially expandable clamping ring is received between a head of the threaded bolt and that cone of the twin cone which faces toward the head of the bolt so that the clamping ring is radially expanded when the threaded end of the bolt is screwed into the threaded hole in the component. The outer surface of the radially expanded clamping ring is received in a hole in the respective flexible coupling link so that the radial expansion causes the clamping ring to bear with its outer surface against the wall of the hole in the link to thereby establish a radially effective coupling force. Preferably, the hole in the flexible coupling link is provided with a pressure distributing bushing which in turn receives the clamping ring which expands radially when the screw connector according to the invention is tightened. The screw connectors according to the invention are referred to as first screw connectors.

The flexible coupling link is, for example, a rod or plate one end of which is connected to the gear case and/or motor block, as described above, by the first screw connector. The other end of the flexible coupling link is connected to the respective other component by second connectors such as conventional machine bolts.

The just described connection or coupling compensates for tolerances, including manufacturing tolerances which may cause different spacings between the connecting link and the connecting point in the direction of the longitudinal axis of the first screw connector. This compensation avoids adverse stress causing axial clamping forces since the cooperating conical surfaces of the twin cone self-centering member causes the clamping forces in the form of radially effective clamping forces. Additionally, the present connection or coupling is free of play once tightened.

The mounting of the present coupling device is substantially simplified because the cooperation of the conical surfaces enforces an automatic centering. Such automatic centering is enforced even if initially there is a misalignment between the central axis of the threaded hole in the component and the central axis of the hole or bushing in the flexible coupling link. Such misalignment may be due to play in the centering elements of the engine block and the gear case. The conical surfaces of the twin cone and the conical counter-surfaces of the recess leading into the threaded hole in the component assure the just mentioned automatic self-centering when the threaded bolt is tightened.

In one preferred embodiment a sleeve with a collar or flange is rigidly secured to the threaded bolt so that the sleeve is positioned between the bolt and the twin cone, thereby keeping the elements of the screw connector together. In another preferred embodiment a biasing spring inserted between the radially expandable clamping ring and the respective cone of the twin cone self-centering member makes sure that during initial tightening of the bolt there is a spacing between the clamping ring and the respective cone of the twin cone, whereby a radial expansion of the clamping ring is avoided until a proper alignment is achieved and such expansion then begins after alignment has been achieved. Such alignment is achieved when the component facing conical surface of the twin cone bears against the conical recess in the component such as the engine block or gear case.

BRIEF DESCRIPTION OF THE DRAWINGS

In order that the invention may be clearly understood, it will now be described, by way of example, with reference to the accompanying drawings, wherein:

FIG. 1 is a schematic side view of an engine block and gear case approximately as viewed in the direction of the arrow I in FIG. 2;

FIG. 2 is a view in the viewing plane indicated by the arrows II—II in FIG. 1 to illustrate the position of one flexible coupling link and one rigid coupling link;

FIG. 3 is a view similar to that of FIG. 2, however, in the direction of the arrows III—III in FIG. 1, thereby illustrating the position of two flexible coupling links;

Figure 4:
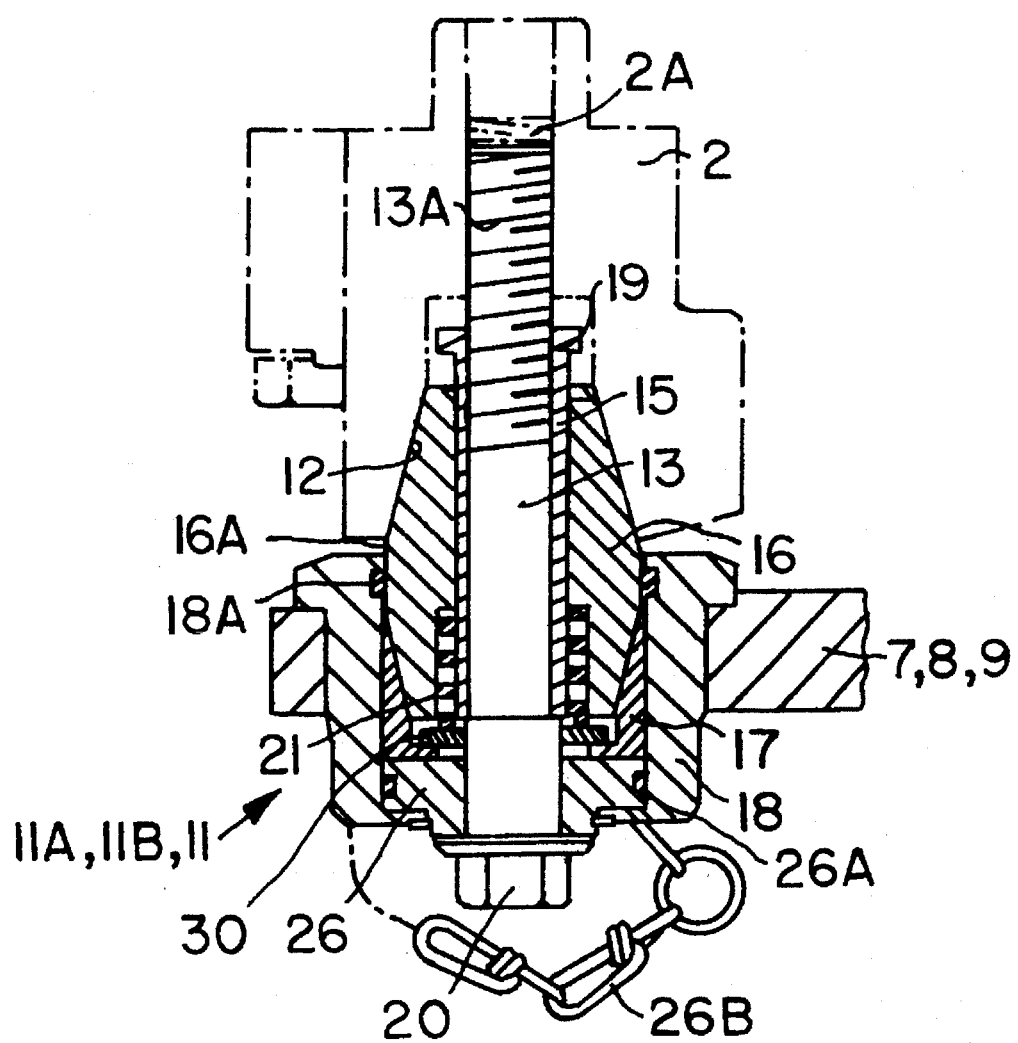
FIG. 4 is an axial sectional view through any one of the self-centering first screw connectors according to the invention, for example, along section line IV—IV in FIG. 1.

DETAILED DESCRIPTION OF PREFERRED EXAMPLE EMBODIMENTS AND OF THE BEST MODE OF THE INVENTION

FIG. 1 shows a schematic side view of the engine block 1 and the gear case 2 with the positions of four connections 3, 4, 5, and 6 between the engine block 1 and the gear case 2. These four connections include a rigid connection 3 with a rigid connector link 10 shown schematically in FIG. 2 and in detail in FIG. 5. The four connections further include three connections 4, 5 and 6, each including a flexible coupling link 7, 8 and 9 and a first screw connector 11, 11A, 11B according to the invention. These screw connectors 11, 11A, 11B have an identical construction shown in detail in FIG. 4. FIG. 1 also shows the facing sides FS of the engine block 1 and the gear case 2. Additionally, the orientation axes of the coupling system are shown in FIG. 1. These orientation axes include a longitudinal engine axis LEA, a vertical engine axis VEA and a cross engine axis CEA. The latter axis CEA extends perpendicularly to the plane of the drawing sheet in FIG. 1.

FIG. 2 shows the view in the direction of the arrows II—II in FIG. 1 in a schematic way to illustrate the contours of the engine block 1 and of the gear case 2 on the facing side FS. The orientation axes LEA, VEA and CEA are also shown in FIG. 2. The longitudinal engine axis LEA extends perpendicularly to the plane of the drawing sheet in FIG. 2. The dashed lines illustrate a conventional gear connection 30 between the engine output shaft the axis of which may coincide with the longitudinal engine axis LEA, and the gear shaft GS. FIG. 2 further shows that the connection 4 comprises a rod 7 that forms a flexible connecting link, one end of which is connected with a self-centering screw connector 11 according to the invention to the gear case 2. The other end of the flexible rod 7 is connected by second connectors SC, such as conventional screws, to the engine block 1. The rigid connection 3 has a rigid connecting link 10 and a centering plug 25 to be described in more detail below with reference to FIG. 5. The rigid connecting link 10 at the connection 3 constitutes the fixed point of the coupling between the engine block 1 and the gear case 2. This fixed connecting point takes up forces and moments in any direction.

FIG. 3 shows the connection 6 with a coupling link 8 also constructed as a flexible rod connected at one end with a first screw connector 11A to the gear case 2 and at the other end with conventional connectors SC to a third coupling link 9 in the form of a plate. The plate 9 in turn is connected with screws SC to the engine block 1 so that the left-hand end of the coupling link 8 is also rigidly connected to the engine block 1 with the plate 9. The coupling plate 9 is stiff in the plane constituted by the drawing sheet which extends in parallel to the facing sides FS of the block 1 and case 2. The plate 9 is flexible in the direction of the longitudinal engine axis LEA. The right-hand lower end of the plate 9 is connected-at 5 through the first screw connector 11B to the gear case 2. Further, the lower end of the plate 9 has a guide fork F which cooperates with a centering pin 27 secured to the gear case 2 for properly aligning the block 1 and the case 2 relative to each other when the centering pin 27 has reached the bottom in a groove of the fork F.

The coupling links 7 and 8 are relatively slender flexible rods or bars having a relatively small bending stiffness in all directions so that a free expansion and contraction, for example in response to temperature variations of the engine block 1 relative to the gear case 2 can take place. Such expansions and contractions radiate out from the rigid connecting point 3 in the direction of the longitudinal engine axis LEA. The plate 9 is stiff in the direction of the vertical engine axis VEA, but relatively flexible in the direction of the longitudinal engine axis LEA, whereby the loads on the rigid connecting point 3 are reduced. However, when the rigid connecting point 3 is positioned substantially in a neutral axis that is positioned centrally of the system, and if the connecting link 10 has the required material strength, the plate 9 may be omitted.

Figure 5:
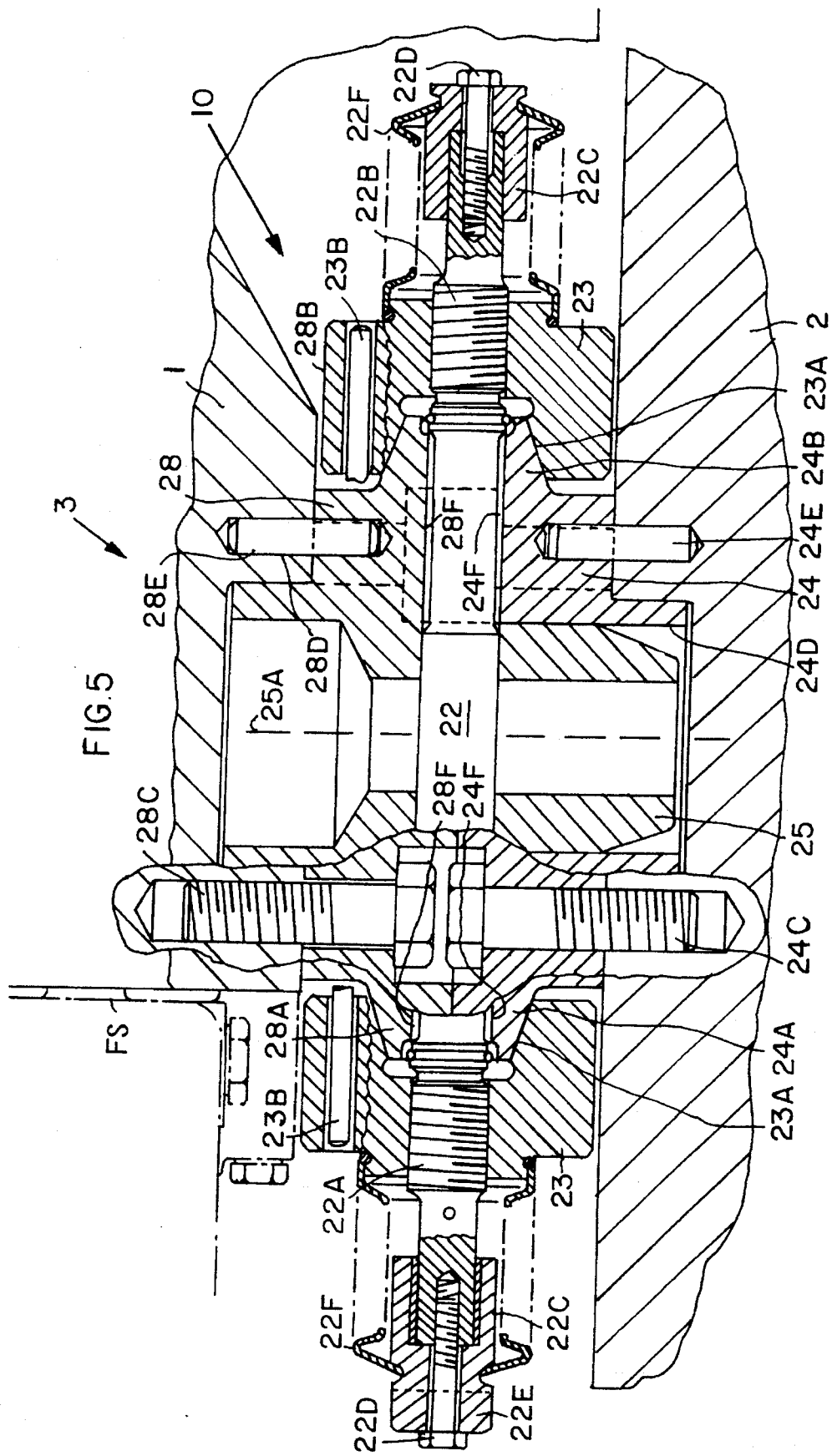
FIG. 5 is a sectional view approximately along section line V—V in FIG. 2 to show the construction of a rigid coupling link.

When the two components such as the engine block 1 and the gear case 2 are assembled as a system, they are first roughly centered relative to each other by a centering plug 25 shown in FIG. 5 that extends with its longitudinal axis in the direction of the cross engine axis CEA or in parallel to CEA so that an alignment and fixing in that direction takes place. The above mentioned fork F cooperating with the centering pin 27 provides the required centering and fixing in the direction of the vertical engine axis VEA.

FIG. 4 illustrates the self-centering first screw connector 11 according to the invention. The other connectors 11A and 11B are of the same construction. The screw connector 11 according to the invention comprises a threaded bolt 13 having a head 20 at its head end and a threading 13A at its far end. Preferably, a sleeve 15 with a collar 19 surrounds the threaded bolt 13 to hold the elements together. The sleeve 15 is rigidly connected with the bolt 13 so that the sleeve 15 rotates with the bolt. This connection may be accomplished, for example, by a portion of the internal threading 13A on the bolt cooperating with an internal threading of the sleeve 15. A twin cone self-centering member 16 has a longitudinal axial bore so that the member 16 can be held on the shaft of the threaded bolt 13 or on the sleeve 15 when such a sleeve is used. The twin cone 16 has an upwardly facing first cone that cooperates with a conical recess 12 leading into a threaded hole 2A in the gear case 2. The twin cone 16 has a second cone with a downwardly facing conical surface that cooperates with a radially expandable clamping ring 17. For this purpose the clamping ring 17 is preferably slotted in its circumferential surface. Additionally, the ring 17 has an inwardly facing conical surface for cooperation with the downwardly and outwardly facing conical surface of the second cone of the twin cone 16. The outer circumferential surface of the radially expandable ring 17 may either bear directly against the inner wall of a hole in the coupling links 7, 8 or 9. However, preferably a pressure distribution bushing 18 is inserted between the expandable ring 17 and the hole in the link 7, 8 or 9. The bushing 18 is rigidly connected to the link, for example, by shrinking or welding or the like. Preferably, the twin cone 16 has a cylindrical portion 16A between its two cones and that cylindrical portion is sealed by a seal 18A positioned between the bushing 18 and the cylindrical surface self-centering twin cone member 16. Incidentally, the other end of the links 7, 8 and 9 are connected to the engine block 1 by the screws SC mentioned above and shown as little crosses in FIGS. 2 and 3.

A pressure transmitting washer 26 surrounding the threaded bolt 13 near its head 20 makes sure that rotation of the threaded bolt 13 into the threaded hole 2A transmits an axial force onto the centering member 16 so that its upper cone engages into the conical recess 12 when the threaded bolt 13 is first rotated. In order to initially prevent contact between the expandable ring 17 and the lower cone of the member 16, an axial biasing spring 21 is positioned between the member 16 and the ring 17. Preferably, the lower end of the spring 21 bears against an inner washer 30 which in turn bears against a radially inwardly reaching flange of the expandable ring 17. The spring 21 initially holds the ring 17 spaced from the downwardly facing surface of the cone of the member 16 until the upper conical surface of the member 16 bears properly in a centered manner against the recess 12. Further rotation of the threaded bolt 13 at this time overcomes the biasing of the spring 21 so that the spring is compressed and the inner surface of the clamping ring 17 will bear against the downwardly facing surface of the twin cone member 16. Further rotation expands the ring 17 radially, whereby a force-locking, force-transmitting connection is achieved through the just described cooperation of the conical surfaces.

The sleeve 15 rigidly connected to the bolt 13 makes sure with its radially projecting collar 19 and with the pressure transmitting plate 26 that all components of the screw connector 11 are held together on the shaft of the threaded bolt 13 and cannot get lost. If the connection is to be released, the threaded bolt 13 is rotated in the release direction. The spring 21 bears against the washer 30 which also in turn bears against the clamping ring 17, whereby the clamping ring 17 is disengaged from the conical surface of the member 16 facing downwardly in FIG. 4. As the threaded bolt 13 is further turned in the release direction, the collar 19 of the sleeve 15 engages the upper end of the twin cone centering member 16, whereby the latter is actually pressed out of its engagement with the conical recess 12 in the gear case 2.

The pressure transmitting plate 26 is provided with a seal 26A in its circumferential surface. The seal 26A bears against the inner surface of the bushing 18. A chain 26B rotatably connected to the plate 26 and to the bushing 18 makes sure that all elements remain connected to the respective link to avoid losing these elements.

The advantage of the invention, especially of the present screw connectors 11, 11A, .11B resides in the fact that tolerances in the position of the coupling links 7, 8, 9 relative to the connecting points 4, 5 and 6 on the gear case 2 in the direction of the longitudinal axis of the screw connectors is fully compensated. Any uneven stress deformations are prevented because the force transmission is accomplished by radially effective forces through the expander ring 17 rather than by axial forces. As a result, the components of the entire system can be manufactured with wider tolerance ranges, whereby the manufacturing is simplified and respective cost savings are obtained. Another advantage of the invention is seen in that the conical surfaces of the twin cone centering member 16 compensate any alignment errors because the conical surfaces are self-centering and perform a self-centering operation as the threaded bolt 13 is tightened.

FIG. 5 shows the details of the rigid coupling link 10 that forms the connecting point 3 between the engine block 1 and the gear case 2. A first anvil-shaped mounting member 28 is secured to the engine block 1 by screws 28C. The above mentioned centering plug 25 is part of the mounting member 28 which also has two axially extending projections 28A and 28B with half conical external surfaces. As shown in FIG. 5, the mounting member 28 and its centering plug 25 are of a single-piece integral construction. For securing the anvil-shaped mounting member 28 to the engine block 1, the centering plug 25 having a longitudinal axis 25A is inserted into a bore 24D in a mounting member 24 described below. An alignment pin 28E held in a hole 28D in the engine block 1 makes sure that the mounting member 28 is properly positioned when the alignment pin 28E enters into a respective bore hole in the member 28, whereupon the screw 28C is tightened.

Similarly, the mounting member 24 also has an anvil configuration with two axial projections 24A and 24B. The mounting member 24 is secured to the gear case 2 by screws 24C prior to bringing the gear case 2 and engine block 1 toward each other for the coupling operation. An alignment pin 24E held in place in a bore in the gear case 2 engages a respective bore in the mounting member 24 to properly position the mounting member 24 prior to tightening the screw 24C.

Once the two mounting members 24 and 28 have been secured to the gear case 2 and engine block 1 respectively, a drive spindle 22 of a clamping mechanism is inserted into a half groove or channel 24F in the mounting member 24. The mounting member 28 also has a half groove or channel 28F that is mirror-symmetrical to the groove or channel 24F so that the drive spindle 22 is enclosed when the engine block 1 and the gear case 2 are tightened to each other.

Such tightening is accomplished by two clamping elements 23, each having a conical recess 23A for engaging the respective conical projections 24A, 28A, and 24B and 28B of the mounting members 24 and 28 respectively. Each clamping element 23 has an internal threading engaged by a respective threading 22A and 22B on the drive spindle 22. The drive spindle threading 22A is, for example left-handed and the threading 22B is right-handed or vice versa in order to tighten the clamping elements 23 onto the projections 24A, 28A, and 24B, 28B. For this purpose the drive spindle 22 has axially outer projections to which caps 22C are secured by screws 22D. At least one cap 22C is provided with a tool engageable surface 22E having, for example, a square or hexagonal configuration. Flexible covers 22F protect the threadings 22A and 22B against entry of dirt and moisture. The tool engageable surface 22E is provided on the facing side FS of the system.

The covers 22F are sufficiently flexible to permit the axial displacement of the clamping elements 23 when the spindle 22 is rotated. The spindle rotation does not axially displace the spindle 22. The clamping elements 23 are interlocked by pins 23B against a fixed point to prevent rotation of the elements 23 while permitting their axial displacement toward and away from each other by a respective rotation of the spindle 22.

Although the invention has been described with reference to specific example embodiments, it will be appreciated that it is intended to cover all modifications and equivalents within the scope of the appended claims.

What we claim is:

1. A coupling device comprising two components (1, 2) to be coupled to each other, at least one flexible connecting link (7), a connector (SC) connecting one end of said at least one connecting link to one of said two components, a first screw connector (11) including a threaded bolt (13) with a threaded end and a head end (20), a centering member (16) having a central longitudinal bore through which said threaded bolt extends so that said centering member is slideably movable axially on said threaded bolt, said centering member (16) having a first outer conical surface facing toward said threaded end and a second outer conical surface facing toward said head end of said threaded bolt, a conical recess (12) and a threaded bore (2A) coaxial with said conical recess (12) in the other component of said two components so that tightening of said threaded bolt (13) pulls said first outer conical surface of said centering member (16) into said conical recess (12) for centering, a hole with walls in the other end of said at least one connecting link (7), a radially expandable clamping ring (17) positioned in said hole of said at least one connecting link, said radially expandable clamping ring (17) having an inner conical surface engaging said second outer conical surface of said centering member (16), said radially expandable clamping ring (17) having a radially outer surface for pressing said radially expandable clamping ring against said walls of said hole in said at least one connecting link (7) between said two components.

2. The coupling device of claim 1, further comprising a sleeve (15) surrounding said threaded bolt (13) and passing longitudinally through said centering member (16), said sleeve (15) being rigidly secured to said threaded bolt to prevent relative rotation between said threaded bolt (13) and said sleeve (15), said sleeve (15) having a collar (19) facing said threaded end (13A) of said threaded bolt (13), said sleeve collar (19) keeping said centering member (16) on said threaded bolt (13).

3. The coupling device of claim 1, further comprising a pressure transmitting plate (26) between said head end (20) of said threaded bolt (13) and said radially expandable clamping ring (17).

4. The coupling device of claim 1, further comprising a biasing spring (21) surrounding said threaded bolt (13), said biasing spring bearing with a first spring end against said centering member and with a second spring end against said radially expandable clamping ring (17) for biasing said radially expandable clamping ring (17) away from said centering member until said threaded bolt has been sufficiently tightened to overcome the biasing force of said biasing spring (21).

5. The coupling device of claim 4, further comprising a washer (30) between said second spring end of said biasing spring (21) and said radially expandable clamping ring (17).

6. The coupling device of claim 1, wherein said first screw connector (11) further comprises a pressure distribution bushing (18) rigidly secured in said hole of said at least one connecting link (7), said pressure distribution bushing (18) having a through-hole with an inner surface engaging said radially outer surface of said radially expandable clamping ring (17).

7. The coupling device of claim 6, wherein said inner surface of said through-hole in said pressure distribution bushing (18) and said outer surface of said radially expandable clamping ring (17) are cylindrical surfaces.

8. The coupling device of claim 6, wherein said centering member (16) has a cylindrical section between said first and said second outer conical surfaces of said centering member, and a sealing ring (18A) between said cylindrical section and said pressure distribution bushing (18).

9. A coupling system comprising an engine block and a gear case, at least three coupling links (7, 8, 9) connecting said engine block and said gear case to each other, first screw connectors (11) connecting one end of each of said at least three coupling links to one of said engine block and said gear case and second connectors (SC) connecting the other end of each of said at least three coupling links to the other of said engine block and said gear case, at least two of said first screw connectors (11) each comprising a threaded bolt (13) with a threaded end and a head end, a centering member (16) having a central longitudinal bore through which said bolt extends so that said centering member is slideably movable axially on said threaded bolt, said centering member (16) having a first outer conical surface facing toward said threaded end and a second outer conical surface facing toward said head end of said bolt for engaging a conical recess (12) in one of said engine block and said gear case, a radially expandable clamping ring (17) having an inner conical surface engaging said second outer conical surface of said centering member, said radially expandable clamping ring (17) having a radially outer surface for pressing said radially expandable clamping ring against a hole in a respective coupling link (7, 8) of said at least three coupling links between said engine block and said gear case.

10. The coupling system of claim 9, wherein each of said at least two of said first screw connectors further comprises a pressure distribution bushing (18) rigidly secured in said hole of said respective coupling link, said pressure distribution bushing (18) having a through-hole with an inner surface engaging said radially outer surface of said radially expandable clamping ring (17).

11. The coupling system of claim 9, wherein said at least three coupling links comprise a first rigid coupling link (10) that is stiff against bending and second and third coupling links (7, 8) that are flexible against bending in a direction extending crosswise of a length of said second and said third coupling links (7, 8), said second and said third coupling links (7, 8) extending in parallel to facing sides of said engine block (1) and of said gear case (2), each of said at least two of said first screw connectors (11) connecting a respective first end of said second and said third coupling links (7, 8) to said gear case (2) so that a longitudinal axis of said bolts (13) extends perpendicularly to said facing sides of said engine block and of said gear case for operating said head ends of said bolts on said facing sides of said engine block and said gear case, wherein said second and said third coupling links have second ends connected to said engine block by said second connectors (SC), said first rigid coupling link (10, 22) extending in parallel with a centering plug (25) and to said second and said third coupling links (7, 8), and spaced from said second and said third coupling links, said first rigid coupling link (10) comprising tightening means (22) also operable on said facing sides of said engine block and of said gear case.

12. The coupling system of claim 11, wherein said first rigid coupling link (10) is positioned at a level lower than said second and said third coupling links (7, 8).

13. The coupling system of claim 11, wherein said at least three coupling links include a fourth coupling link (9) extending in parallel to said facing sides of said engine block and of said gear case, said fourth coupling link (9) having a first end and a second end, wherein another of said first screw connectors comprises a further screw connector (11B) securing said first end of said fourth coupling link (9) to said gear case (2), said fourth coupling link (9) being spaced from said first rigid coupling link (10) in a direction of a longitudinal engine axis (LEA) of said engine block (1), said fourth coupling link (9) having a larger stiffness in the direction parallel to said facing sides of said engine block and of said gear case than in the direction perpendicularly to said facing sides of said engine block and of said gear case.

14. The coupling system of claim 13, wherein said fourth coupling link (9) is a plate extending substantially in parallel to said facing sides of said engine block and of said gear case, said plate (9) having a larger dimension parallel to said facing sides of said engine block and of said gear case and a smaller dimension perpendicularly to said facing sides of said engine block and of said gear case.

15. The coupling system of claim 13, wherein said first end of said fourth coupling link (9) that is connected to said gear case by said further screw connector (11B), comprises a fork (F), said gear case (2) comprising a centering pin (27) projecting from said facing side of said gear case for cooperation with said fork (F) for centering said engine block and said gear case relative to each other.

16. The coupling system of claim 11, wherein said tightening means (22) of said first rigid coupling link (10) comprises a twin clamping device including a drive spindle (22), two threaded clamping elements (23) on said drive spindle, said clamping elements having first conical clamping surfaces (23A), said engine block and said gear case having second conical surfaces (24A, 28A, 24B, 28B) cooperating with said first conical clamping surfaces (23A) of said clamping elements (23) for centering and clamping said engine block (1) and said gear case (2) relative to each other when said drive spindle is operated.

17. The coupling system of claim 16, wherein said drive spindle (22) extends horizontally and is accessible to a tool for rotating said drive spindle (22) from said facing sides of said engine block and of said gear case.

18. The coupling system of claim 16, further comprising a centering plug (25) forming part of said twin clamping device, said centering plug (25) having an axis (25A) extending in a direction of a cross engine axis (CEA) of said engine block (1).

19. The coupling system of claim 16, wherein said drive spindle (22) has two axially spaced threaded spindle sections (22A, 22B) having oppositely pitching threads (22A, 22B).

20. The coupling system of claim 16, wherein said drive spindle (22) has axially outer ends (22C, 22D) at least one of which is accessible to a tool for rotating said drive spindle.

* * * * *